United States Patent
Richards et al.

(10) Patent No.: US 10,751,910 B1
(45) Date of Patent: Aug. 25, 2020

(54) CONCRETE CURING BLANKET

(71) Applicant: Ramshorn Corporation, Huntington Beach, CA (US)

(72) Inventors: Randall C. Richards, Fallbrook, CA (US); Gary M. Crowel, Fallbrook, CA (US)

(73) Assignee: Ramshorn Corporation, Huntington Beach, CA (US)

( * ) Notice: Subject to any disclaimer, the term of this patent is extended or adjusted under 35 U.S.C. 154(b) by 151 days.

(21) Appl. No.: 15/825,648

(22) Filed: Nov. 29, 2017

(51) Int. Cl.
*B28B 11/24* (2006.01)
*C04B 40/04* (2006.01)
*B32B 5/08* (2006.01)
*E04G 21/24* (2006.01)

(52) U.S. Cl.
CPC ............ *B28B 11/245* (2013.01); *B32B 5/08* (2013.01); *C04B 40/04* (2013.01); *E04G 21/246* (2013.01)

(58) Field of Classification Search
None
See application file for complete search history.

(56) References Cited

U.S. PATENT DOCUMENTS

| | | |
|---|---|---|
| 4,485,137 A | 11/1984 | White |
| 4,900,377 A | 2/1990 | Redford et al. |
| 5,743,895 A | 4/1998 | Reiss |
| 5,849,816 A | 12/1998 | Suskind |
| 5,877,097 A | 3/1999 | West |
| 7,572,525 B2 | 8/2009 | McDonald |
| 2002/0088581 A1* | 7/2002 | Graef .............. D21F 11/002 162/158 |
| 2005/0214507 A1* | 9/2005 | McDonald .......... B28B 11/245 428/138 |
| 2008/0258341 A1* | 10/2008 | Parkes ............... B28B 11/245 264/299 |
| 2009/0148596 A1 | 6/2009 | Carroll |
| 2010/0025886 A1 | 2/2010 | Carroll |
| 2016/0222685 A1* | 8/2016 | Richards ........... E04G 21/246 |
| 2017/0306628 A1* | 10/2017 | Simonis ............. B32B 27/08 |

* cited by examiner

*Primary Examiner* — Arti Singh-Pandey
(74) *Attorney, Agent, or Firm* — Eric Karich; Karich & Associates

(57) ABSTRACT

A concrete curing blanket having an absorbent sheet including at least 50% viscose fibers and 5-20% polyethylene, by weight. Super absorbent materials are positioned within the absorbent sheet. A vapor barrier is bonded to the absorbent sheet to prevent dehydration of the concrete curing blanket while in use.

4 Claims, 1 Drawing Sheet

CONCRETE CURING BLANKET

BACKGROUND OF THE INVENTION

Field of the Invention:

This invention relates generally to a concrete curing blanket, and more particularly to a concrete curing blanket that includes an absorbent sheet that includes super absorbent materials enmeshed within the fibers of the absorbent sheet.

Description of Related Art:

Concrete strength and durability improves when the concrete is thoroughly hydrated during curing. If the concrete is kept wet for the first 7-10 days after setting, strength and durability thereof is increased 75% over ordinary aging of concrete in dry surface conditions.

To keep concrete hydrated, the concrete industry has come to rely on concrete curing blankets for covering wetted concrete and extending the duration of damp conditions on the curing surface of the concrete. An example of such a concrete curing blanket is disclosed in McDonald, U.S. Pat. No. 7,572,525, which teaches a curing blanket that includes a vapor barrier, and an airlaid layer consisting of a binder material and a natural cellulose bleached fluff pulp fiber derived from wood through Kraft processing. The prior art teaches the use of concrete curing blankets that include an airlaid layer that includes natural cellulose bleached fluff pulp fiber derived from wood through Kraft processing. However, the prior art does not teach a concrete curing blanket that includes an absorbent sheet that includes a wicking layer, a super absorbent material, and a tissue layer, laminated together, which is covered with a vapor barrier having a plurality of perforations. The present invention fulfills these needs and provides further advantages as described in the following summary.

SUMMARY OF THE INVENTION

The present invention teaches certain benefits in construction and use which give rise to the objectives described below.

The present invention provides a concrete curing blanket having an absorbent sheet formed of nonwoven entangled fibers including at least 50% viscose fibers and 5-20% polyethylene, by weight, the absorbent sheet having a first surface and an opposed second surface; super absorbent materials enmeshed within the nonwoven entangled fibers of the absorbent sheet, physically held within the absorbent sheet by the nonwoven entangled fibers; and a vapor barrier bonded to the second surface of the absorbent sheet.

A primary objective of the present invention is to provide a concrete curing blanket having advantages not taught by the prior art.

Another objective is to provide a concrete curing blanket that includes super absorbent materials within an absorbent sheet constructed of viscose and polyethylene.

A further objective is to provide a concrete curing blanket that is inexpensive to manufacture, easy to use, resistant to tearing, and provides superior hydration for extended periods of time.

Other features and advantages of the present invention will become apparent from the following more detailed description, taken in conjunction with the accompanying drawings, which illustrate, by way of example, the principles of the invention.

BRIEF DESCRIPTION OF THE DRAWINGS

The accompanying drawings illustrate the present invention. In such drawings.

DETAILED DESCRIPTION OF THE INVENTION

The above-described drawing figures illustrate the invention, a concrete curing blanket 10 that is used for providing hydration to a concrete slab C during the curing process, to provide concrete that has superior strength and durability.

Figure 1:
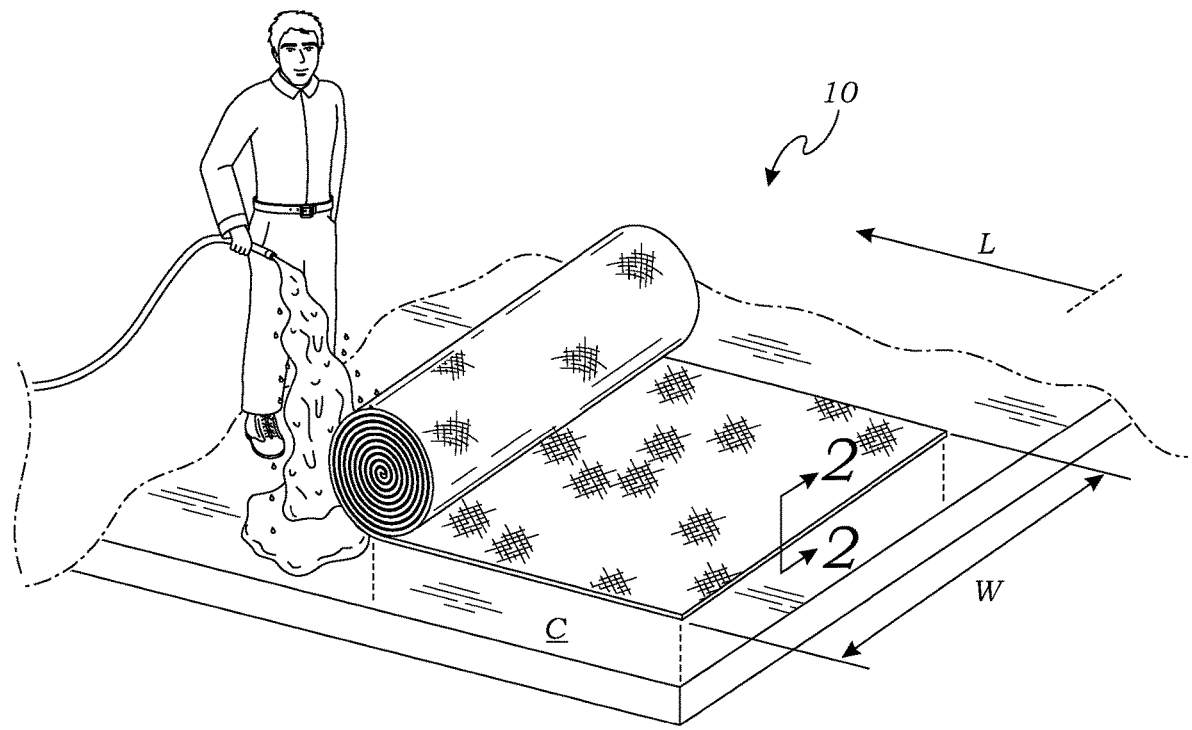
FIG. 1 is a perspective view of a concrete curing blanket according to one embodiment of the present invention, illustrating the concrete curing blanket being positioned on a concrete slab while water is poured onto the concrete slab and into the concrete curing blanket.

FIG. 1 is a perspective view of one embodiment of the concrete curing blanket 10 operatively positioned on the concrete slab C. As illustrated in FIG. 1, the concrete curing blanket 10 is manufactured in a roll that is sized for being unrolled over the concrete slab C to effectively cover the concrete slab C. The concrete curing blanket 10 is at least about 1 meter wide, and about 10 meters long. In a typical embodiment, the concrete curing blanket 10 is 1-3 meters wide (in this case about 2.5 meters wide), and about 30-60 (or more) meters long. In alternative embodiments, the measurements may vary according to the needs of the user, but they will be sufficiently large to be useful in covering concrete slabs, which may be of considerable size. As used in this application, the term "about" is hereby defined to include +/−10%.

As illustrated in FIG. 1, before and while the concrete curing blanket 10 is positioned on the concrete slab C, water is poured in large amounts onto the concrete slab C and into and over the concrete curing blanket 10, so that the concrete slab C is thoroughly hydrated, and the concrete curing blanket 10 is thoroughly soaked. Once saturated, the concrete curing blanket 10 maintains an optimal amount of water in contact with the surface of the concrete slab C, which optimizes the strength and durability of the concrete when cured.

While one form of concrete slab C is illustrated herein, the term "concrete slab" is hereby defined to include any form of structure that may require this form of hydration, including structures, supports, walls, pillars, and other concrete elements known in the art. Indeed, due to the superior water carrying characteristics of the present invention, the concrete curing blanket 10 is particularly useful when used on angled or vertical structures, which might otherwise be difficult to keep hydrated.

Figure 2:
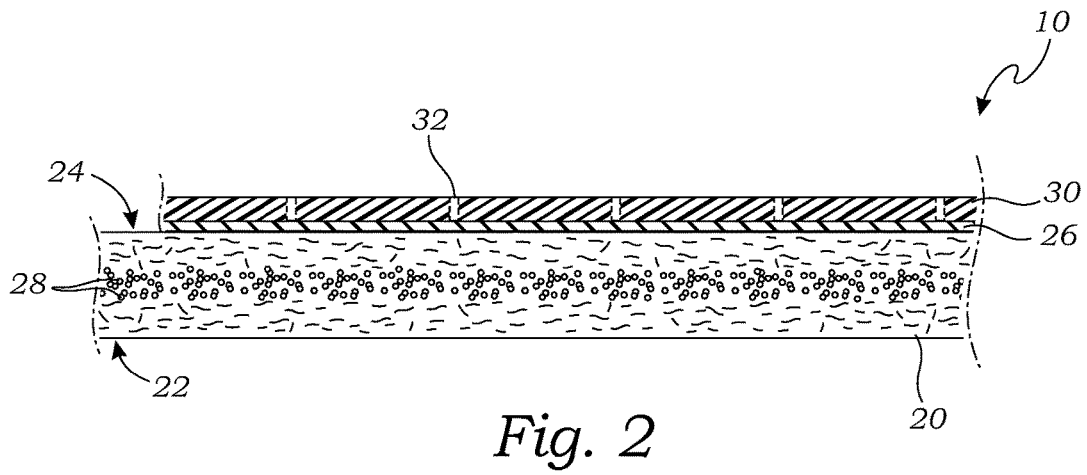
FIG. 2 is a sectional view of the concrete curing blanket taken along line 2-2 in FIG. 1.

FIG. 2 is a sectional view of the concrete curing blanket 10 taken along line 2-2 in FIG. 1. As shown in FIG. 2, the concrete curing blanket 10 comprises an absorbent sheet 20 having a first surface 22 and an opposed second surface 24. Super absorbent materials 28 are enmeshed within nonwoven entangled fibers of the absorbent sheet 20, physically held within the absorbent sheet 20 by the nonwoven entangled fibers. The composition of the absorbent layer 20 is discussed in greater detail below. The concrete curing blanket 10 further comprises a vapor barrier 30 bonded to the second surface 24 of the absorbent sheet 20, in this embodiment with a bonding layer 26.

The absorbent sheet 20 is able to quickly wick up water from the pool of water formed on the concrete slab C (as shown in FIG. 1) as it is rolled onto the concrete slab C, so that the water is quickly and efficiently drawn into the concrete curing blanket 10. Water may also be poured directly onto the roll of the concrete curing blanket 10, to assure that the concrete curing blanket 10 is thoroughly hydrated.

In the current embodiment, the absorbent sheet 20 is a nonwoven fabric, such as a spunlaced nonwoven fabric that is formed of nonwoven entangled fibers including at least 50% viscose fibers and 5-20% polyethylene, by weight. For purposes of this application, the term "polyethylene" is defined to include both polyethylene (PE) and polyethylene terephthalate (PET), as well as equivalent materials which are known to those skilled in the art to promote bonding when heat and pressure are applied. Polypropylene is generally considered not to be a suitable alternative for this requirement. In the present embodiment, the absorbent sheet 20 includes about 90% viscose fibers, and 10% polyethylene.

The super absorbent materials 28 may include super absorbent polymers, super absorbent fibers, and/or other similar or equivalent materials. As used in the present application, the term "super absorbent" is defined to include materials that can absorb and retain extremely large amounts of liquid relative to their own mass, at least 100 times its own weight in distilled water. Water absorbing super absorbent materials may absorb aqueous solutions through hydrogen bonding with water molecules. A super absorbent material's ability to absorb water is a factor of the ionic concentration of the aqueous solution. In deionized and distilled water, a super absorbent material may absorb 500 times its weight (30-60 times its own volume), although this ability drops to only about 10% of this amount when salt is present. The total absorbency and swelling capacity are controlled by the type of and degree of cross-links used to make the gel. Low density cross-linking have a higher absorbency, which higher cross-link density exhibits lower absorbent capacity and swell, but greater gel strength and firmness.

In one embodiment, the super absorbent materials 28 may be made from the polymerization of acrylic acid bended with sodium hydroxide in the presence of an initiator to form a poly-acrylic acid sodium salt, sometimes referred to as sodium polyacrylate. Other materials known in the art may also be used in this manner. In the present embodiment, the super absorbent materials 28 include a sodium polycarbonate polymer, and may further include additional additives, as known in the art.

The vapor barrier 30 of FIG. 2 is a film comprising polyethylene, polypropylene, or other material known in the art that is substantially vapor impervious, to prevent dehydration of the concrete curing blanket 10. The vapor barrier 30 may include perforations 32 so that water may be added from the top of the concrete curing blanket 10, so long as the perforations 32 are not large enough to enable excessive drying of the concrete curing blanket 10.

In this embodiment, the absorbent layer 20 and the vapor barrier 30 are bonded together with a heat activated bonding agent 26, and bonded together with heat and pressure. In this embodiment, a the heat activated bonding agent 26 is a hot melt pressure sensitive adhesive. In alternative embodiments, other forms of bonding agents or equivalent materials (e.g., contact cement, etc.) may be used.

As used in this application, the words "a," "an," and "one" are defined to include one or more of the referenced item unless specifically stated otherwise. Also, the terms "have," "include," "contain," and similar terms are defined to mean "comprising" unless specifically stated otherwise. Furthermore, the terminology used in the specification provided above is hereby defined to include similar and/or equivalent terms, and/or alternative embodiments that would be considered obvious to one skilled in the art given the teachings of the present patent application.

What is claimed is:

1. A concrete curing blanket consisting of:
    a. an absorbent sheet formed from of nonwoven entangled fibers consisting of: about 90% viscose fibers and about 10% polyethylene fibers by weight,
    b. superabsorbent materials enmeshed within the nonwoven entangled fibers which are physically held within the absorbent sheet by the fibers themselves;
    c. the absorbent sheet having a first surface and an opposing second surface;
    and a vapor barrier bonded to the second surface of the absorbent sheet.

2. The concrete curing blanket of claim 1, wherein the vapor layer is bonded to the absorbent sheet with a bonding layer that includes a hot melt pressure sensitive adhesive.

3. The concrete curing blanket of claim 1, wherein the vapor layer includes a plurality of perforations.

4. The concrete curing blanket of claim 1, wherein the super absorbent materials include a sodium polycarbonate polymer.

* * * * *